May 13, 1969 N. P. GRECO ET AL 3,444,135
CLEAR HEAT STABLE PRODUCT OF 1,2-EPOXY
RESIN AND MELLOPHANIC DIANHYDRIDE
Filed March 29, 1967
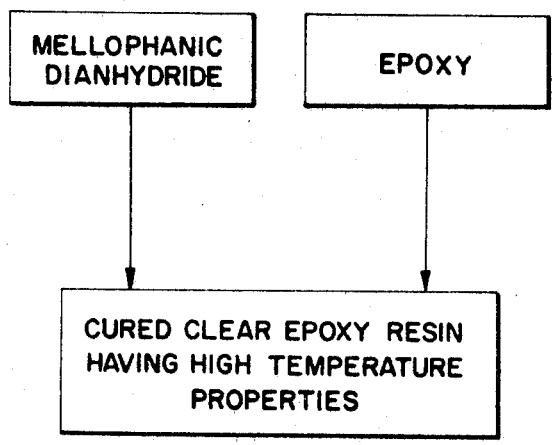
INVENTORS.
NICHOLAS P. GRECO &
CHARLES J. PENNINO
BY John P. Taylor
their Attorney

United States Patent Office 3,444,135
Patented May 13, 1969

3,444,135
CLEAR HEAT STABLE PRODUCT OF 1,2-EPOXY RESIN AND MELLOPHANIC DIANHYDRIDE
Nicholas P. Greco, Pittsburgh, and Charles J. Pennino, Monroeville, Pa., assignors to Koppers Company, Inc., a corporation of Delaware
Filed Mar. 29, 1967, Ser. No. 626,845
Int. Cl. C08g 30/00, 29/00; C08f 3/00
U.S. Cl. 260—47
3 Claims

ABSTRACT OF THE DISCLOSURE

Clear heat stable epoxy resins are produced using a dianhydride hardener. The hardener is a dianhydride of 1,2,3,4-benzene tetracarboxylic acid (mellophanic dianhydride). The lower melting point of the particular dianhydride and its good solubility in epoxy resins enable the dianhydride to be dissolved into the epoxy at lower temperatures than with other known dianhydride hardeners. The result is a product that is both clear and heat resistant in contrast to the opaque resins usually produced with epoxy-dianhydride systems because of the insolubility of the prior art dianhydrides except at impractical temperatures.

The composition may be used as textile auxiliaries, laminating resins, varnishes, lacquers, dipping resins, castings, encapsulating, coating, filling, packing materials or adhesives.

BACKGROUND OF THE INVENTION

Anhydrides of aliphatic, aromatic, and cycloaliphatic carboxylic acids have been extensively used as curing agents for epoxy resins. A well-known dianhydride, pyromellitic dianhydride which has the formula:

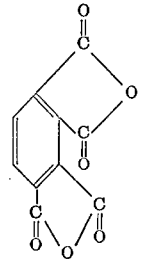

is extensively used as a hardener when high temperature properties are desired. The advantage of this dianhydride for epoxy resins over the simple monoanhydrides of dibasic acids is that epoxides hardened with this dianhydride usually have a higher heat distortion temperature as well as higher heat stability than the same resin hardened with monoanhydrides.

There are, however, certain disadvantages attended upon the use of pyromellitic dianhydride. The pyromellitic dianhydride has a high melting point (284–286° C.) and it is difficult to dissolve in epoxy resins. Pyromellitic dianhydride has a further disadvantage in that the useable life of the mixture of epoxy resin and pyromellitic dianhydride is inconveniently short at the temperature which is necessary to maintain the dianhydride in solution in the epoxy resin. As a result, epoxy resins cured with pyromellitic dianhydride are usually opaque or cloudy because complete solubility of the dianhydride cannot be obtained at temperatures low enough to prevent instantaneous gelation of the epoxy resin-dianhydride mixture.

High temperature stable epoxy resins are used extensively in the electrical industry in potting or encapsulation applications because of the excellent dielectric properties and low shrinkage of epoxies in general coupled with the high heat stability and high heat distortion temperatures (over 200° C.) of epoxy compounds formed using a dianhydride. However, it is very desirable in such applications to have a clear casting so that the work may be visually inspected to insure that the encapsulation is complete. An opaque epoxy resin having high temperature properties is useless for such applications when a visual inspection is required.

SUMMARY OF THE INVENTION

Quite surprisingly, it has now been discovered that mellophanic dianhydride which has the formula:

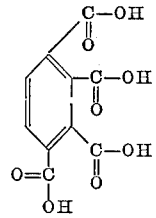

has a high solubility in epoxy resins at temperatures well below the gelation temperature and has a much lower melting point enabling it to be used with epoxy resins as a hardener or curing agent at temperatures which may be as much as 80 or 90° C. lower than the respective temperature needed to form a solution when using, for example, pyromellitic dianhydride. The result is a clear epoxy resin which, however, retains the heat stability characteristics normally associated with dianhydride cured epoxy resin systems.

In accordance with the invention, a cured high temperature stable compound having a high degree of clarity consisting essentially of the reaction product of an epoxy resin having an epoxy equivalent greater than 1 and mellophanic dianhydride.

DETAILED DESCRIPTION

Mellophanic acid which has the formula:

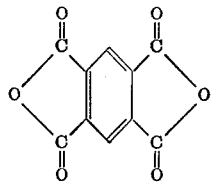

may be obtained by the oxidation of 1,2,3,4-substituted benzenes to 1,2,3,4-benzene tetracarboxylic acid (mellophanic acid). A typical preparation is described for example, in the Journal of the Pharmaceutical Society of Japan, volume 73, at page 928. The mellophanic acid is readily converted to the dianhydride by subliming in a vacuum, for example, or by heating to 250° C. for about 15 minutes at atmospheric pressure.

Mellophanic dianhydride is an off-white powder having a molecular weight of 218, an anhydride equivalent weight (theoretical) of 109 and a melting point of 193° C.

The mellophanic dianhydride may be dissolved into a liquid epoxy resin at room temperature, but the mixture of dianhydride and epoxy is advantageously heated to about 60° C. to accelerate the formation of the clear solution. This temperature is still well below the curing temperature, and thus, there is no problem of premature gelation while forming the mellophanic dianhydride-epoxy solution. The minimum temperature needed to achieve solubility within practical time limits is somewhat dependent upon the particle size to which the mellophanic dianhydride has been ground to. Obviously, the smaller the particle size, the faster solubility will be achieved at any given temperature.

It should be noted here that the convenient gelling temperatures (for gel times of less than 2 hours) of either a pyromellitic-epoxy system or a mellophanic-epoxy system is from 110–150° C. Therefore, the solubility temperature range of room temperature to about 65° C. in the case of the mellophanic epoxy system in contrast to a solubility temperature of at least 150° C. for a pyromellitic-epoxy system is not merely a matter of a difference in temperature of 85° C. or more, but is rather for all practical purposes the difference between attaining solubility (resulting in a clear casting) or not attaining solubility (resulting in an opaque casting) because the pyromellitic-epoxy system will in reality gel before it completely solubilizes.

Epoxy resins which may be hardened in accordance with the present invention are those having an epoxy equivalent greater than 1, such as, for example, the polyglycidyl ethers and polyalcohols, such as the diepoxide formed by reacting a glycol such as butane 1,4-diol with epichlorohydrin and polyglycidyl ethers of polyphenols such as resorcinol, bis(4-hydroxyphenol)dimethylmethane, or condensation products of aldehydes with phenols (novolaks).

Epoxy equivalent is herein defined as the average number of 1,2-epoxy groups:

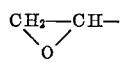

per molecule of epoxy resin.

The composition of the invention may also include plasticizers or coloring agents and may be used as textile auxiliaries, laminating resins, varnishes, lacquers, dipping resins, casting resins and as encapsulating, coating, filling, or packing materials, adhesives and the like.

The following examples will further serve to illustrate the invention.

Example I 29 parts of mellophanic dianhydride was added at room temperature to 100 parts of a liquid bisphenol A diglycidyl ether (Epon 828) having an epoxy equivalent of 1.9 and an equivalent weight of 180–190 based on epoxy content. The epoxy is formed by reacting 2,2'-bis(4-hydroxyphenylene)propane with epichlorohydrin. The dianhydride epoxy mixture was heated to 65° C. to facilitate the solution of the dianhydride in the epoxy resin. The resulting clear solution was cast as a series of plates 8" x 8" x 1/8". The castings were heated in the mold to a temperature of 110° C. and held there for a period of 2 hours to cure. The casting had a heat distortion temperature (measured according to ASTM D648-56) of 225° C. The casting was clear and had a Hellige color index of 9.

Example II

For purposes of comparison, samples were prepared following the procedures of Example I, but substituting pyromellitic dianhydride for mellophanic dianhydride.

A comparison of the two resins appears in the following tables.

TABLE I

| Sample | Hellige color index | Barcol | Heat distortion (264 p.s.i.) (° C.) | Flex. Strength, p.s.i. | Flex. mod.×10⁻⁵ p.s.i. |
| --- | --- | --- | --- | --- | --- |
| Sample A (mellophanic dianhydride) | 9 (clear) | 89 | 225 | 7,700 | 5.1 |
| Sample B (pyromellitic dianhydride) | Opaque yellow | 90 | 251 | 8,400 | 4.3 |

Thermal stability of epoxy resins cured with mellophanic dianhydride and pyromellitic dianhydrides:

TABLE II

| | Percentage weight losses at 260° C. | | |
| --- | --- | --- | --- |
| | 24 hours | 48 hours | 7 days |
| Sample A (mellophanic dianhydride) | 5.1 | 8.5 | 19.4 |
| Sample B (pyromellitic dianhydride) | 4.4 | 10.5 | 19.8 |

The results indicated that an epoxy resin hardened with mellophanic dianhydride yields a clear casting, yet possesses approximately the same high temperature properties obtained using pyromellitic dianhydride which yields opaque castings.

The invention provides an expoy resin cured with a dianhydride giving the high heat and strength characteristics together with clear castings and low temperature blending and curing of the epoxy resins not previously attainable using pyromellitic dianhydrides. Thus, the invention provides a clear, low temperature cure, high heat stable epoxy resin able to withstand high temperature exposure not previously possible with a clear epoxy resin system.

What is claimed is:

1. A cured, high temperature stable, epoxy compound having a high heat distortion temperature and having a high degree of clarity consisting essentially of a reaction product formed at a temperature of at least 60° C., of a 1,2-epoxy resin having an epoxy equivalent greater than 1 and mellophanic dianhydride.

2. The epoxy compound of claim 1 wherein the epoxy resin is the reaction product of 2,2'-bis(4-hydroxyphenylene)propane and epihalohydrin.

3. The epoxy compound of claim 1 wherein the heat distortion temperature of the compound is at least 225° C.

References Cited

UNITED STATES PATENTS 3,324,081  6/1967  Barie et al.

OTHER REFERENCES

Beilstein: "Organische Chemi," B and XIX, II, p. 217.

WILLIAM H. SHORT, Primary Examiner.

T. PERTILLA, Assistant Examiner.

U.S. Cl. X.R.

117—161; 161—184; 260—2, 78.4